United States Patent [19]
Kitajima et al.

[11] Patent Number: 5,761,352
[45] Date of Patent: Jun. 2, 1998

[54] OPTICAL SWITCH HAVING A TWO-LEVEL CROSSING BETWEEN INPUT/OUTPUT OPTICAL WAVEGUIDES

[75] Inventors: Shigeki Kitajima, Kawasaki; Hideaki Takano, Kokobunji; Toshihisa Tsukada, Musashiro; Hiroaki Inoue, Hidaka, all of Japan

[73] Assignee: Hitachi, Ltd., Tokyo, Japan

[21] Appl. No.: 668,139

[22] Filed: Jun. 21, 1996

[30] Foreign Application Priority Data

Jun. 22, 1995 [JP] Japan .................... 7-155763

[51] Int. Cl.$^6$ .................................... G02B 6/26
[52] U.S. Cl. .................................... 385/16
[58] Field of Search .................... 385/16, 17, 141

[56] References Cited

U.S. PATENT DOCUMENTS

| | | | |
|---|---|---|---|
| 4,618,210 | 10/1986 | Kondo | 385/17 |
| 4,737,003 | 4/1988 | Matsumura et al. | 385/17 |
| 4,813,757 | 3/1989 | Sakano et al. | 385/16 |

FOREIGN PATENT DOCUMENTS

| | | |
|---|---|---|
| 56-48603 | 5/1981 | Japan . |
| 2-193125 | 7/1990 | Japan . |
| 2-199430 | 8/1990 | Japan . |

*Primary Examiner*—Akm E. Ullah
*Attorney, Agent, or Firm*—Fay, Sharpe, Beall, Fagan, Minnich & McKee

[57] ABSTRACT

An optical switch has an input optical waveguide and an output optical waveguide that are physically and optically separated from each other by a two-level crossing arrangement. The direction of optical signal propagation is switchable by a connecting optical waveguide to provide optical coupling between the input and output optical waveguides. Crosstalk and loss due to diffraction at each crossing are small, and insertion loss does not increase, even for a large-scale application.

33 Claims, 12 Drawing Sheets

5,761,352

OPTICAL SWITCH HAVING A TWO-LEVEL CROSSING BETWEEN INPUT/OUTPUT OPTICAL WAVEGUIDES

BACKGROUND OF THE INVENTION

1. Field of the Invention

The present invention relates generally to optical switches, and more particularly, to optical switching of optical signal paths in optical communication and information processing devices.

2. Description of the Related Art

Large-capacity optical transmission technology has advanced to a state where information exceeding 1 gigabit per second can be transmitted. However, for a system that processes optical signals by converting the optical information into an electrical signal, the switching capacity is at the upper limit. To increase switching capacity, optical switches have been employed for switching high-speed optical signals. In large-scale applications, such optical switches require low insertion loss and low crosstalk.

A conventional type of optical switch has a plurality of parallel input optical waveguides crossing a plurality of parallel output optical waveguides, and switches for switching the optical paths at the crossing points. At each crossing point, switching is effected by directing an optical signal propagating along one of the input optical waveguides straight through the switch (OFF state), or by redirecting the optical signal from the input optical path to a predetermined corresponding one of the output optical waveguides (ON state). However, even in the OFF state, part of the optical signal leaks into the output optical waveguide due to diffraction. This leakage signal affects the output signal as crosstalk, or causes an insertion loss proportional to the number of passed crossings as a diffraction loss. The problem of crosstalk or insertion loss is a primary reason that switch scale has been limited. For example, in the case of a matrix switch, the total crosstalk level is determined by the product of the crosstalk level of a unit switch and the number of passed switches. Therefore, to decrease the total crosstalk level of a 1000×1000 optical switch matrix to a −30 dB level, it is necessary to set the signal/crosstalk ratio to 60 dB.

Crosstalk and insertion loss have been suppressed by a method using an optical gate (Japanese Patent Laid-Open No. 2-193125) and by a method using an optical amplifier (Japanese Patent Laid-Open No. 2-199430). However, the former method involves an increase in the insertion loss, and the latter method, while capable of eliminating insertion loss, suffers from noise due to the accumulated spontaneous emission (ASE) of the optical amplifier, with the result that the switch scale is limited.

Japanese Patent Laid-Open No. 56-48603 discloses another optical switch having a high switching speed and an operable mode having only a few limitations because of the small travel distance of a movable part. The basic constituent elements of this switch are first and second optical waveguides which cross each other in respective planes (two-level crossing), a third waveguide capable of contacting both of the first and second optical waveguides, and an optical switch for switching the light propagation path according to whether the third waveguide is in contact with the first and second two-level crossing waveguides. To reduce the travel distance of a third optical switch which serves as the movable part, the device is constructed so that the first and second two-level crossing waveguides come into contact with each other in a common plane, so that one waveguide is bent to bypass the other, straight, waveguide.

To realize this structure, an electric field is applied in a diffusion process. However, the bypass bending waveguide structure involves a loss due to the two-level crossing, and causes an insertion loss similar to that occurring at each crossing.

SUMMARY OF THE INVENTION

The conventional optical switch thus has a problem of crosstalk and insertion loss due to diffraction at the crossings of optical waveguides, and the additional problem of noise from the optical amplifier. Although there exist methods of solving these problems individually, the prior art has not known an optical switch which is capable of simultaneously realizing low crosstalk, low insertion loss, and low noise.

An object of the present invention is to solve the problems of crosstalk, insertion loss, and noise in an optical switch, and in a large-scale optical switch array.

An optical switch that achieves the above object includes a straight input optical waveguide and a straight output optical waveguide occupying respective planes and which overlap each other without contacting each other. Thus, the input and output optical waveguides are normally separated from each other optically. To establish an optical connection between the input and output optical waveguides, a connecting optical waveguide is provided. The connecting optical waveguide is switched between ON and OFF states, either mechanically or by injection and discharge of a dielectric liquid into and from a waveguide-shaped gap.

Since the input and output optical waveguides cross each other in different respective planes, and are separated optically from each other when the switch is in the OFF state, diffraction loss at the crossing is suppressed. Additionally, employing straight waveguides enables signal loss to be suppressed.

When the optical switch is in the ON state (in which the connecting optical waveguide is located adjacent to the input and output optical waveguides), an optical signal which is propagating along the input optical waveguide transfers to the connecting optical waveguide by the optical coupling between the input and connecting waveguides, and then to the output optical waveguide by the optical coupling between the connecting and output waveguides. When the optical switch is in the OFF state (in which the connecting optical waveguide is physically and optically separated from the input and output optical waveguides), the lack of optical coupling between the input and connecting waveguides and between the connecting and output optical waveguides ensures that any signal loss at the connecting point is small. In this OFF state, the total loss due to diffraction and to undesirable coupling of the waveguides is no greater than 0.01 dB. In addition, the crosstalk per unit switch can be suppressed to $\leq 60$ dB.

DETAILED DESCRIPTION OF THE PREFERRED EMBODIMENTS

FIGS. 1(A)–1(D) illustrate an optical switch constructed according to the teachings of the present invention. The optical switch includes a straight input optical waveguide 1 and a straight output optical waveguide 2. The input and output optical waveguides 1, 2 occupy separate respective planes, and are said to cross each other in two levels (so-called "two-level crossing"). In the OFF state, the input and output optical waveguides 1, 2 are physically and optically separated from each other. In the ON state, the input and output optical waveguides are coupled via a connecting optical waveguide 3.

Figure 1A:
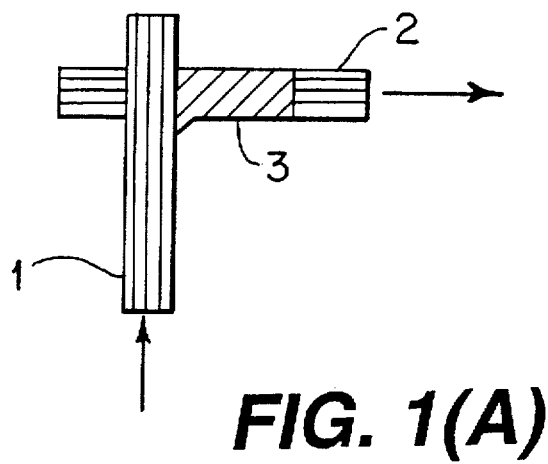
FIGS. 1(A)–1(D) schematically illustrate an optical switch constructed according to the teachings of the present invention.
Figure 1B:
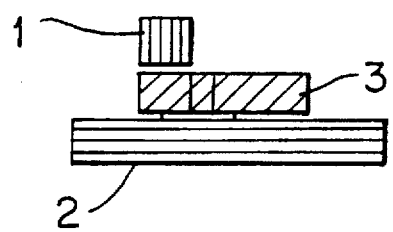
Figure 1C:
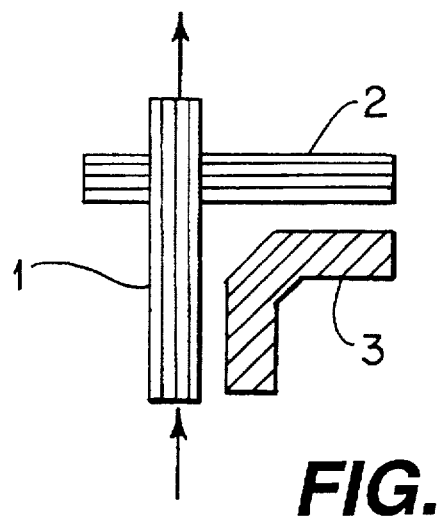
Figure 1D:
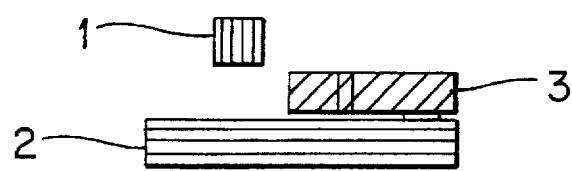

The switch is placed in the ON state by mechanically moving the connecting optical waveguide 3 into position to optically couple the input and output waveguides 1, 2, or, in an alternative embodiment, by injecting a dielectric liquid such as silicone oil into a waveguide-shaped gap. FIG. 1(A) is a top plan view showing the ON state of the optical switch. FIG. 1(B) is a front elevational view showing the OFF state of the optical switch. FIG. 1(C) is a top plan view showing the OFF state of the optical switch, and FIG. 1(D) is a front elevational view showing the OFF state of the optical switch.

When the optical switch is in the ON state, a signal propagating along the input optical waveguide 1 is transferred to the connecting optical waveguide 3, and then to the output optical waveguide 2. When in the OFF state, on the other hand, there is no coupling means between the input and output optical waveguides, and thus crosstalk is minimized. Furthermore, diffraction losses are minimized, and undesirable optical coupling is also suppressed.

Figure 2:
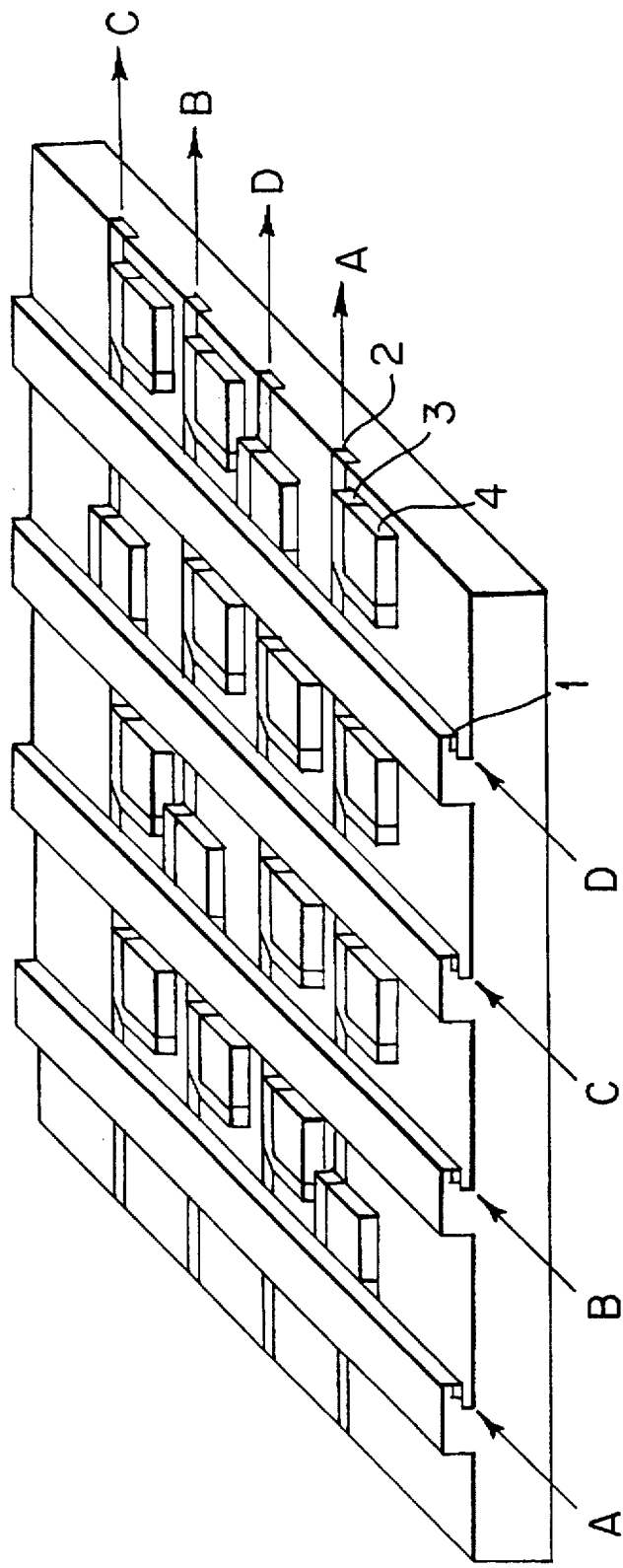
FIG. 2 illustrates an embodiment of a 4×4 optical switch array constructed according to the teachings of the present invention.

FIG. 2 illustrates a construction of a 4×4 optical switch array according to the teachings of the present invention. The optical switch array includes four straight input optical waveguides 1, four straight output optical waveguides 2, and 16 connecting optical waveguide blocks 4, each including a connecting optical waveguide 3. The entire optical switch array has a three-layer structure, including a layer containing the input optical waveguides 1, a layer containing the connecting optical waveguides 3, and a layer containing the output optical waveguides 2, the layers being arranged in the stated order from bottom to top. An optical input A that is input to one of the input optical waveguides 1 is propagated in the direction indicated by the arrow, and after changing its propagation direction at the position of the first connecting optical waveguide block 4, the optical input A propagates along the output optical waveguide 2 and is output as an optical output A. This illustrates the ON state of the optical switch. An optical input B propagates along another input optical waveguide 1, but does not change its propagation direction at the position of the first connecting optical waveguide block 4. This is the OFF state of the optical switch. The optical input B changes its propagation direction at the position of the third connecting optical waveguide block 4 when on, and is then propagated along the output optical waveguide 2 and output as an optical output B.

Figure 3A:
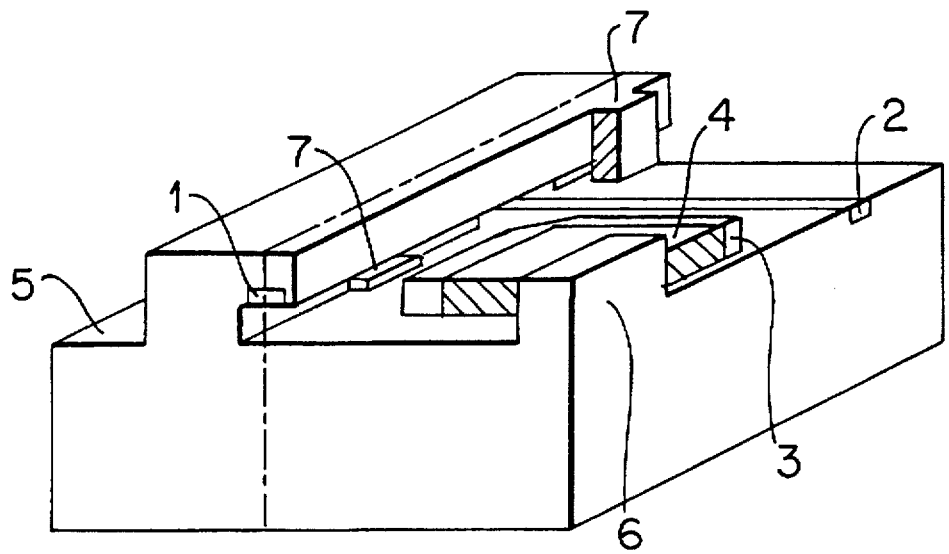
FIGS. 3(A)–3(B) illustrate the construction of a unit optical switch.
Figure 3B:
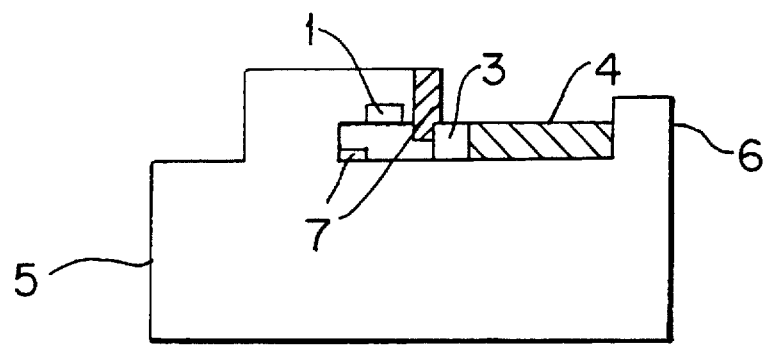

FIGS. 3(A) and 3(B) show the construction of a unit switch constructed according to a first embodiment. FIG. 3(A) is a perspective view showing the unit switch in the OFF state. The unit switch includes an input optical waveguide 1, an output optical waveguide 2, a connecting optical waveguide 3, and a connecting optical waveguide block 4 that is integrated with or fixed to the connecting optical waveguide 3. The input optical waveguide 1 is preferably suspended from a support position formed integrally with a substrate 5, and the top and side faces of the input optical waveguide 1 are respectively covered with clad layers while the bottom face is open. The output optical waveguide 2 is embedded in the substrate 5, and the bottom and side faces of the output optical waveguide 2 are respectively covered with clad layers while the top face is open. Thus, the input optical waveguide 1 and the output optical waveguide 2 constitute a two-level crossing structure and are separated optically, so that crosstalk due to optical leakage is small.

FIG. 3(B) is a side view showing the OFF state of the unit switch. In this embodiment, when the unit switch is in the OFF state, the connecting optical waveguide block 4 is in contact with a stopper 6. Thus, the input optical waveguide 1 and the connecting optical waveguide 3 are optically separated from each other. Since an input optical signal propagating along the input optical waveguide 1 is not coupled to the connecting optical waveguide 3, the input optical signal is not transmitted to the output optical waveguide 2. Propagation loss is further lessened because both of the input and output optical waveguides are straight in this embodiment.

Figure 4A:
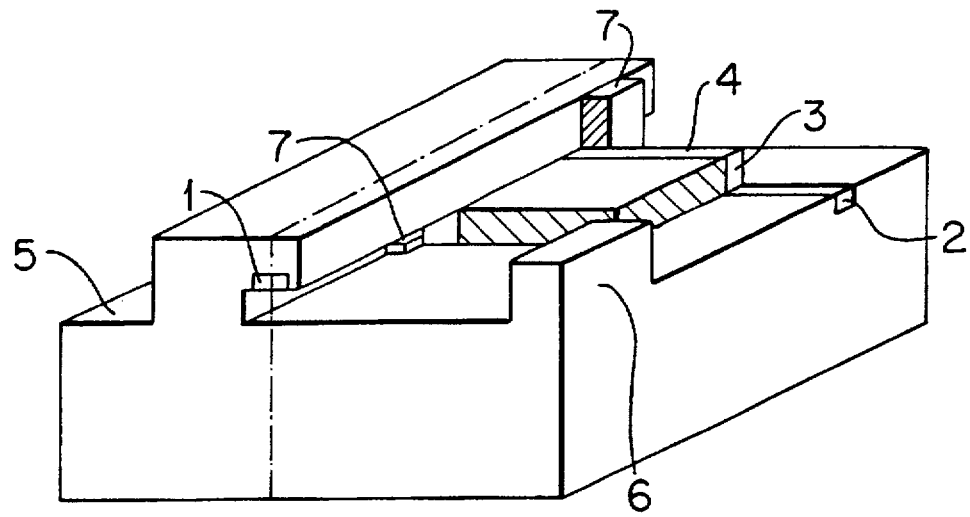
FIGS. 4(A)–4(B) illustrate the construction of a unit optical switch.
Figure 4B:
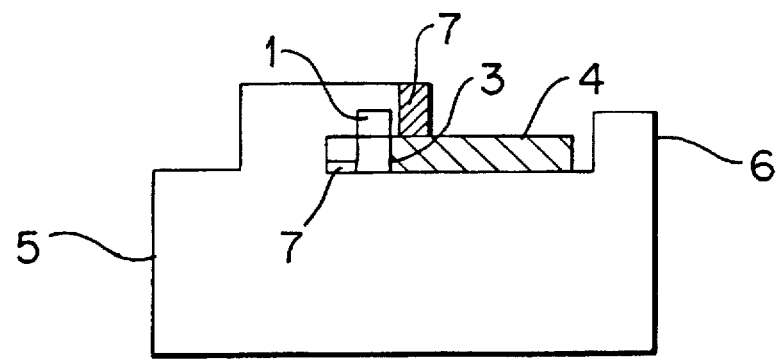

FIG. 4(A) is a perspective view of the unit switch in the ON state. As shown, the connecting optical waveguide block 4 is in contact with a stopper 7 and inserted between the input optical waveguide 1 and the output optical waveguide 2. Thus, an optical signal propagating along the input optical waveguide 1 is transferred to the connecting optical waveguide 3, which is in contact with and coupled to the input optical waveguide 1. Then, the optical signal is propagated along the connecting optical waveguide 3, and reflected at a right angle by total internal reflection at the end surface, which is constructed at an angle of 45° to the direction of propagation. The reflected optical signal is transferred to the output optical waveguide 2 while being propagated along the connecting optical waveguide 3 because the connecting optical waveguide 3 and the output optical waveguide 2 are in contact and optically coupled. The connecting optical waveguide block 4 is accurately positioned by the stopper 7 to ensure efficiency of optical coupling with sharply distinct ON and OFF switching.

Figure 5:
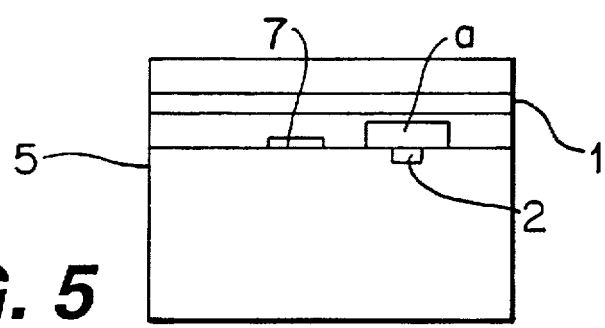
FIG. 5 illustrates the construction of a unit optical switch.

If the output optical waveguide 2 is covered with a clad layer at a two-level crossing portion, the optical signal propagating therealong undergoes loss due to reflection and refraction. In the present embodiment, however, as can be seen from the cross-sectional view shown in FIG. 5, the entire top face of the output optical waveguide 2 is preferably opened by adopting a tunnel structure (without a covering clad layer), so that losses due to reflection and refraction are avoided. Thus, the optical signal propagating along the output optical waveguide 2 is output as an optical signal after being propagated with a loss of not greater than 0.01 dB through the other unit switches which are in the OFF state.

Although the present embodiment has been described with integral optical waveguide 1 and substrate 5, which improves the mechanical strength of the switch, the optical switch may also be realized by separately fabricating the input optical waveguide 1 and the support portion, and fixing both of them to the substrate with an adhesive.

Figure 6A:
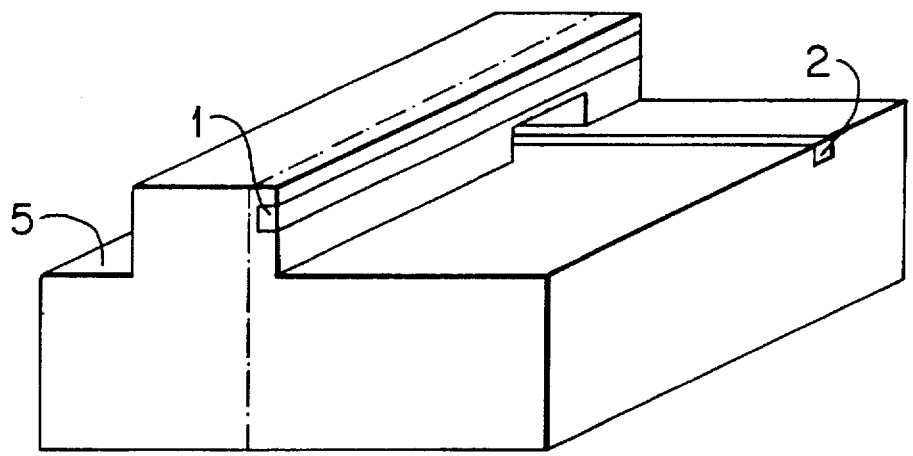
FIGS. 6(A)–6(C) illustrate the construction of a unit optical switch.
Figure 6B:
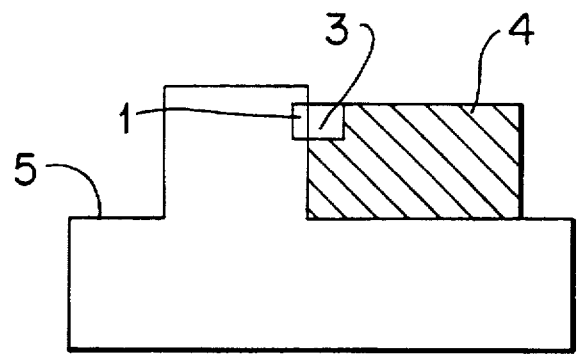
Figure 6C:
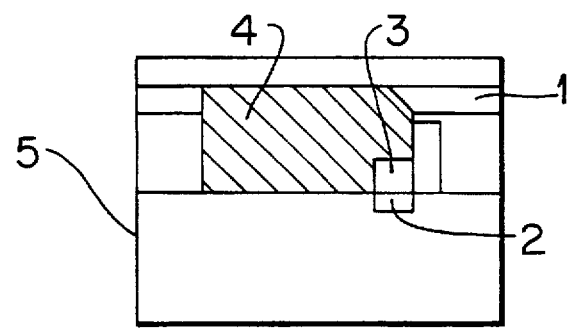

FIGS. 6(A), 6(B), and 6(C) are a perspective view, side view, and cross-sectional view, respectively, of a second embodiment of the invention. In this embodiment, the side face of the input optical waveguide 1 is open rather than the bottom face, as in the previous embodiment, but the principle of operation is the same as that of the previous embodiment. This second embodiment differs from the first embodiment additionally in that the connecting optical waveguide block 4 has a shape that varies in accordance with the positional relationship between the input optical waveguide 1 and the connecting optical waveguide 3.

Figure 7A:
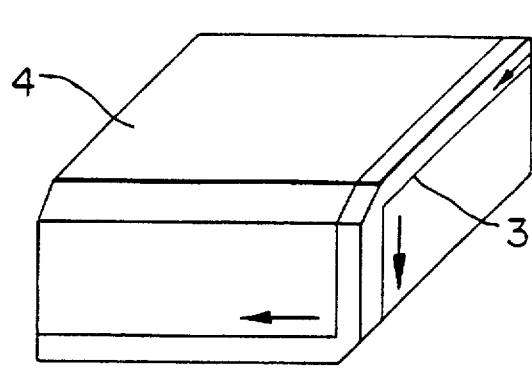
FIGS. 7(A)–7(B) illustrate the construction of a unit optical switch.
Figure 7B:
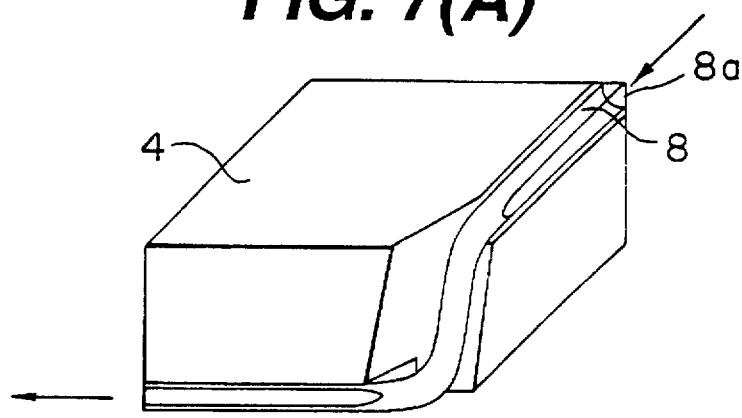

FIG. 7(A) illustrates a preferred shape of the connecting optical waveguide 3 and connecting optical waveguide block 4. The shape of the connecting optical waveguide 3 is selected so that the difference in height between a portion of the optical waveguide that is coupled to the input optical waveguide 1 and a portion that is coupled to the output optical waveguide 2 can be traversed through two total reflections. FIG. 7(B) shows an example in which an optical fiber 8 is employed as the connecting optical waveguide 3. When the diameter of the connecting optical waveguide is at least 2 mm, an optical connecting portion can be realized by the bending of the optical fiber 8. This 2 mm dimension is determined by the minimum bending radius of the optical fiber 8, but the diameter can be reduced further if an optical fiber of large difference of refractive index is employed.

The efficiency of optical coupling in any of the optical coupling parts can be improved by removing or thinning a clad layer 8a by grinding.

Figure 8A:
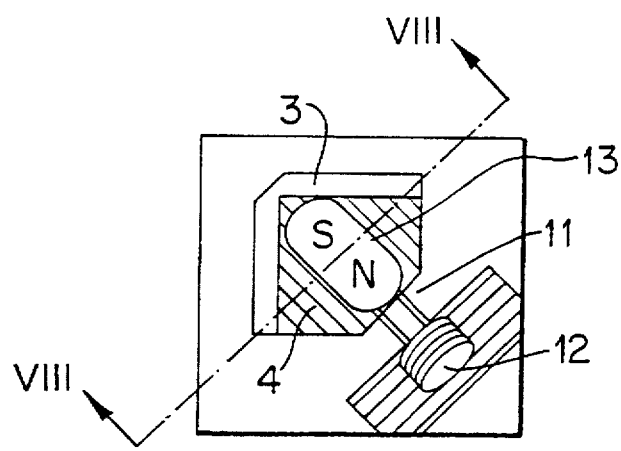
FIGS. 8(A)–8(B) illustrate an embodiment of a mechanism for moving the connecting optical waveguide.
Figure 8B:
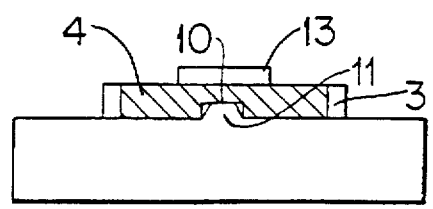

A method of moving the connecting optical waveguide block 4, common to the first and second embodiments, will be described below with reference to FIGS. 8(A) and 8(B). FIG. 8(A) is a top plan view, and FIG. 8(B) is a cross-sectional view, of a preferred mechanical switching mechanism. These figures show the relationship between the connecting optical waveguide block 4 and the stopper 6. The bottom face of the connecting optical waveguide block 4 is provided with a groove 10, so that the connecting optical waveguide block 4 can move along a rail 11 provided on the substrate in correspondence with the groove 10. In this embodiment, a magnetic material 13 is shown fixed to the connecting optical waveguide block 4, and on the connecting optical waveguide 3 side and that opposes the stopper 6 are magnetized to have a magnetic pole, respectively. Magnetization of a plurality of blocks is realized by applying, after the blocks are incorporated into the optical switch array, a strong magnetic field to the entire array, and magnetizing the blocks at the same time. A coil 12 is fixed to the stopper 6, so that the OFF state (in which the connecting optical waveguide block 4 is located close to the stopper 6) and the ON state (in which the connecting optical waveguide block 4 is located away from the stopper 6) can be realized using a magnetic field that varies depending on the direction of electric current flowing through the coil 12.

This waveguide block moving technique can also be realized by fixing the magnetic material 13 to the stopper 6 or to the substrate 5, and by providing the coil 12 on the connecting optical waveguide block 4. An electrostatic force method is also possible, by electrically charging the connecting optical waveguide block 4 and by providing a control electrode on the stopper 6. In addition, a method using a linear motor which utilizes ultrasonic vibration is contemplated. In any case, the horizontal movement of each movable part, according to the present invention, makes latching easy.

Figure 9B:
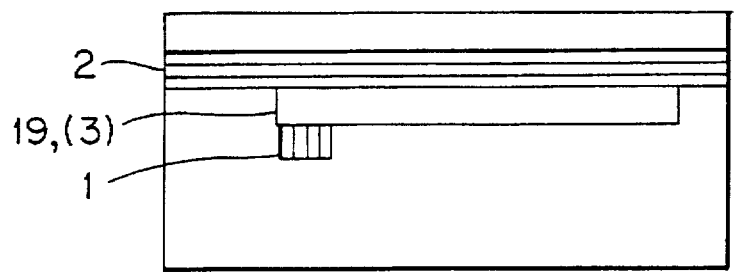
FIGS. 9(A)–9(C) illustrate a view of a unit optical switch.
Figure 9C:
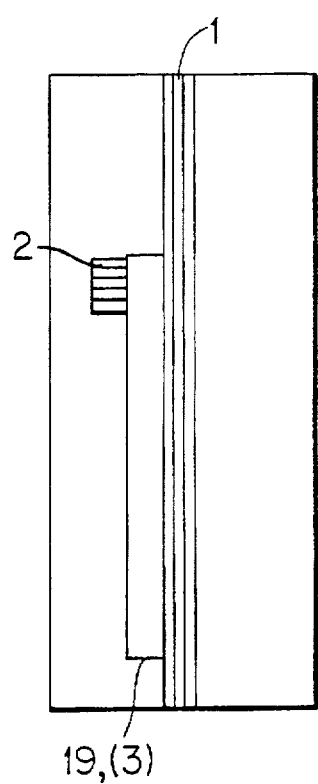
Figure 9A:
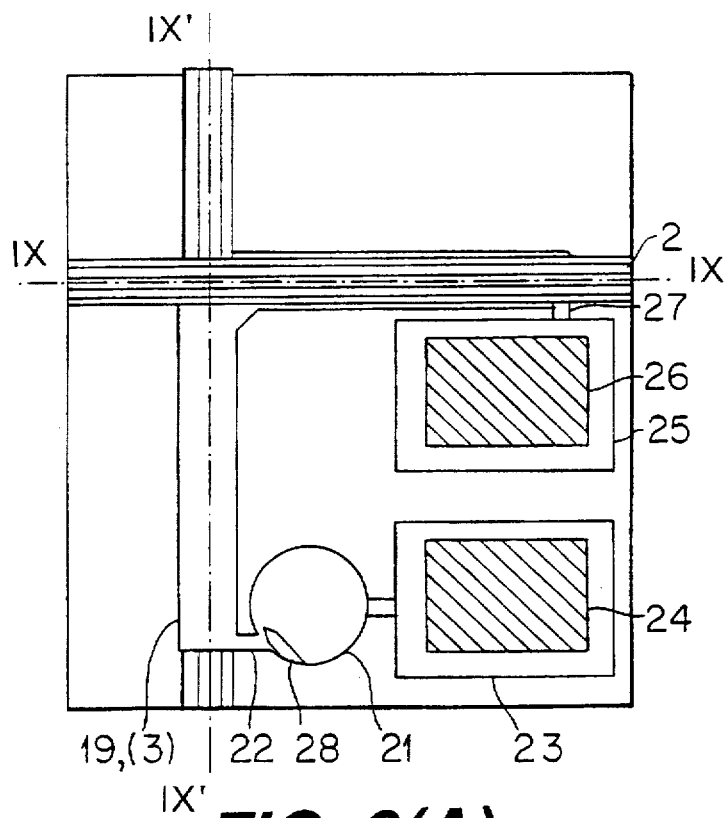

FIGS. 9(A), 9(B), and 9(C) illustrate a third embodiment of a unit switch according to the present invention. FIG. 9(A) is a top plan view of the unit switch, and FIGS. 9(B) and 9(C) are cross-sectional views thereof. As shown, the input optical waveguide 1 and the output optical waveguide 2 two-level cross each other, and a gap 19 is provided between the input and output optical waveguides. Gap 19 serves as the connecting optical waveguide 3.

In addition to these optical waveguides, the depicted embodiment includes a tank 21, and injecting port 22, air chambers 23 and 25, heaters 24 and 26, a gas hole 27, and an oil valve 28. When the unit switch is in the OFF state, the gap 19 contains no oil and does not optically couple the input and output optical waveguides 1, 2. Accordingly, an optical signal propagating along the input optical waveguide 1 maintains its straight path of travel. On the other hand, when the unit switch is in the ON state, a dielectric liquid is injected into the gap 19, which then serves as the connecting optical waveguide 3. Accordingly, an optical signal propagating along the input optical waveguide 1 travels through the connecting optical waveguide 3 and transfers to the output optical waveguide 2. The oil injection mechanism will be described later.

Figure 10B:
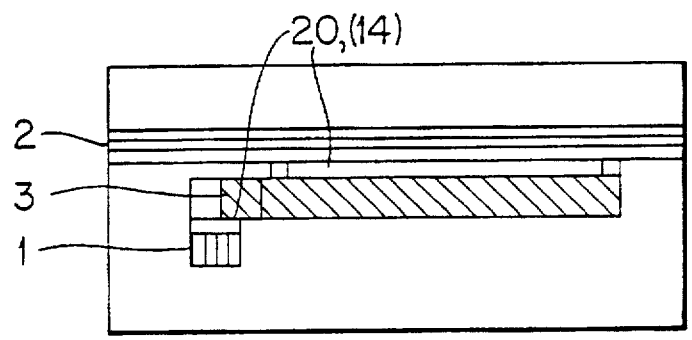
FIGS. 10(A)–10(C) illustrate a view of a unit optical switch.
Figure 10C:
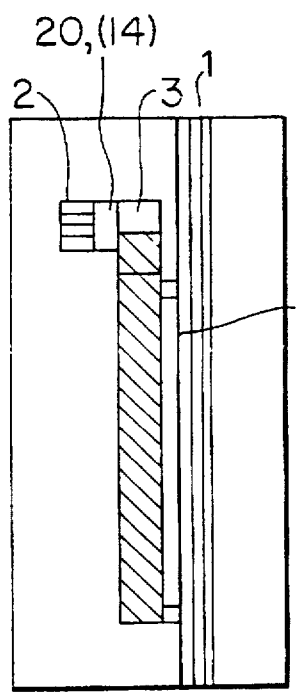
Figure 10A:
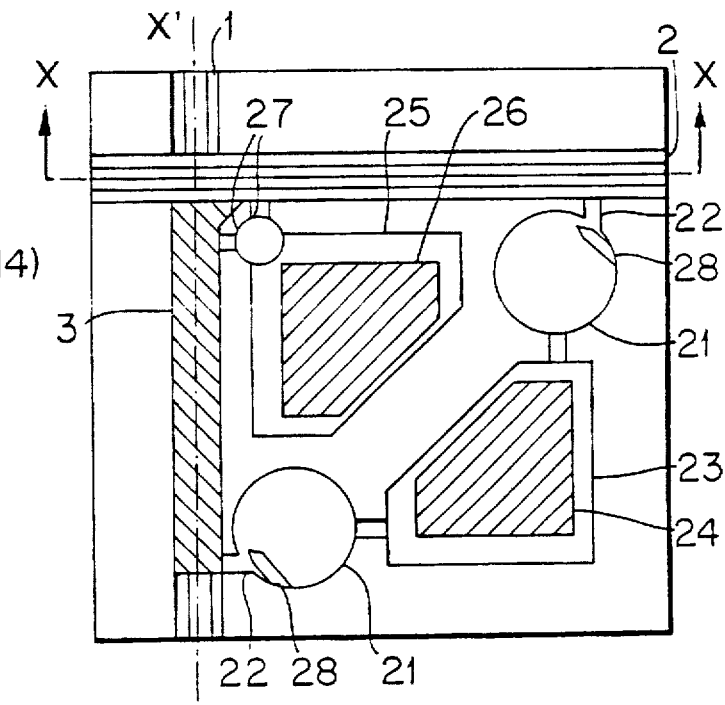

FIGS. 10(A), 10(B), and 10(C) illustrate a fourth embodiment of a unit switch constructed according to the present invention. FIG. 10(A) is a top plan view, and FIGS. 10(B) and 10(C) are cross-sectional views. As shown, the input optical waveguide 1 and the output optical waveguide 2 two-level cross each other, and the connecting optical waveguide 3 is interposed between the input and output optical waveguides. In addition to these optical waveguides, the present embodiment includes gaps 20 (optical couplings 14), tanks 21, injecting ports 22, air chambers 23 and 25, heaters 24 and 26, gas holes 27, and oil valves 28.

When the unit switch is in the OFF state, the gap 20 between the input optical waveguide 1 and the connecting optical waveguide 3 and the gap 20 between the connecting optical waveguide 3 and the output optical waveguide 2 are filled with gas, so that there is no optical coupling. Accordingly, an optical signal propagating along the input optical waveguide 1 maintains a straight path of travel. However, when a dielectric liquid is injected into the gaps 20, optical coupling is achieved and the unit switch is brought to the ON state. In this state, an optical signal propagating along the input optical waveguide 1 travels through the connecting optical waveguide 3 and the optical coupling parts 14 (fluid-filled gaps 20) and transfers to the output optical waveguide 2.

A method of injecting the dielectric liquid for either of the third and fourth embodiments will be described next. As shown in FIGS. 9(A)–9(C) and 10(A)–10(C), gap 19/20, tank 21, injecting port 22, air chambers 23 and 25, heaters 24 and 26, gas holes 27, and oil valves 28 are all employed in the injection. The dielectric liquid, which may be a refraction index matching oil such as silicone oil, water, alcohol, or any other suitable solvent, is provided in the tank 21. When the air chamber 23 is heated by the heater 24, the gas pressure of the air chamber 23 rises by thermal expansion and the dielectric liquid is pressurized. The dielectric liquid, the backward flow of which has been checked by the oil valve 28, is injected into the gap 19 or 20 through the injecting port 22 by the gas pressure rise. The injected dielectric liquid stably stays in the gap 19 or 20 owing to capillarity.

When the air chamber 25 is heated by the heater 26, the gas pressure of the air chamber 25 rises by thermal expansion and the silicone oil in the gap 19 or 20 is pressurized. The silicone oil is returned to the tank 21 by the pressure rise of the gas, which enters the gap 19 or 20 through the gas hole 27.

This method can also be realized by utilizing a rise in gas pressure due to boiling by pulse-heating the dielectric liquid directly. Since a large pressure variation is obtained, the variation of characteristics of the oil valve 28 can be tolerated. In addition, the dielectric liquid can be injected and discharged at high pressure and high speed.

It is further possible to realize the above method by utilizing the pressure of a compressed gas stored in a gas tank, instead of employing the air chambers 23 and 25 and the heaters 24 and 26. In this case, since a stable gas pressure is obtained, the requirements of mechanical strength can be relaxed.

In the present invention, the use of a dielectric liquid, such as silicone oil, for refractive index matching stabilizes the efficiency of optical coupling. However, since the influence of the silicone oil on the problem of optical crosstalk during the OFF state is small, it is preferable to utilize a dielectric liquid other than silicone oil, as mentioned above.

Figure 11A:
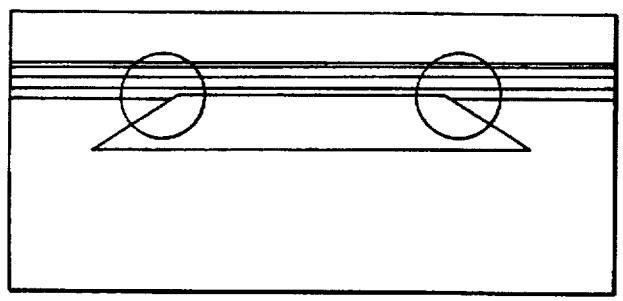
FIGS. 11(A)–11(B) are diagrams for explaining the structure of a gap filled with a dielectric liquid for moving the connecting optical waveguide.
Figure 11B:
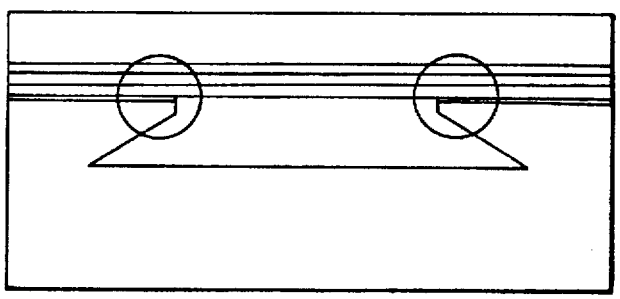

Each of the gaps of the third and fourth embodiments has ends bending at right angles for simplicity of the present disclosure. As a result, both reflection and diffraction are caused. Tapering the gaps solves this problem, as shown in FIGS. 11(A) and 11(B). This construction also has the effect of reducing the influence of refractive index mismatch.

In the present embodiment, $SiO_2$ is preferably used for the substrate 5, and each core is doped with Ti. The core portion of each of the input optical waveguide 1 and the output optical waveguide 2 has a refractive index of 0.3% and a size of 7 µm×5 µm, in a preferred embodiment. The length of the optical coupling of the waveguides 1, 2 during the ON state is 100 µm. During the OFF state, the distance between the connecting optical waveguide 3 and each of the input and output optical waveguides 1, 2 is set to not less than 5 µm. Thus, the diffraction loss of the unit switch is 0.001 dB, and the ratio of signal to crosstalk due to diffraction is not less than 60 dB. The insertion loss per unit switch is not greater than 0.0016 dB (considering both diffraction loss and propagation loss (0.04 dB/cm×150 µm)). With these characteristics, it is possible to realize an insertion loss of not greater than 3.2 dB and a crosstalk of 30 dB in a switch part, even if a 1000×1000 crossbar optical switch array is produced.

If $SiO_2$ is used for the clad layer, the core may also be doped with a material other than Ti, such as F or Ge. The optical switch can also be fabricated by using a compound semiconductor, $LiNbO_3$, or a polymer.

The insertion loss can be suppressed by taking account of the following three points regarding waveguide sizes:

(1) Designing the input and output optical waveguides 1, 2 to have the smallest possible propagation loss is advantageous. However, the propagation loss in the connecting optical waveguide 3 is generally not a problem because its propagation length is short.

(2) In the case of an optical signal transfer by optical coupling between two optical waveguides, if the optical signal transfers from a waveguide of smaller effective refractive index to a waveguide of larger effective refractive index, the efficiency of optical coupling is improved. For this reason, the effective refractive indexes of the respective waveguides are preferably designed to become smaller in the following order: output optical waveguide 2, connecting optical waveguide 3, input optical waveguide 1. Otherwise, the effective refractive index of the connecting optical waveguide 3 is graded so that the effective refractive index is at a maximum at the portion of the connecting optical waveguide 3 through which an optical signal is received from the input optical waveguide 1, and is at a minimum at the portion of the connecting optical waveguide 3 through which the optical signal is transferred to the output optical waveguide 2. However, since a structure in which the refractive index steeply varies leads to a large loss, a tapered structure, such as those shown in FIGS. 11(A) and 11(B), is adopted so that the loss can be decreased.

(3) To increase the tolerance of the connecting optical waveguide 3, a large core size is preferable. Since each clad layer has the same refractive index, the core size can be increased by decreasing the refractive index of the connecting optical waveguide 3.

The result of a design made by consideration of the above three points is as follows. The refractive index and the size of the input optical waveguide 1 are 1.5 and 7 µm×5 µm, respectively, and the refractive index of the connecting optical waveguide 3 is decreased to 1.49, while its size is increased to 7.2 µm×7.2 µm. The refractive index of the output optical waveguide 2 is again increased to 1.5, and its size is 7.2 µm×5.1 µm, which is the same in width. Thus, it is possible to satisfy the above three points.

The effective refractive index is referred to in point 2 above are determined by the refractive index of the core, the refractive index of the clad layer, and the size of the core. Even if the respective refractive indexes are small, the effective refractive indexes can be made large by increasing the core size.

Figure 12:
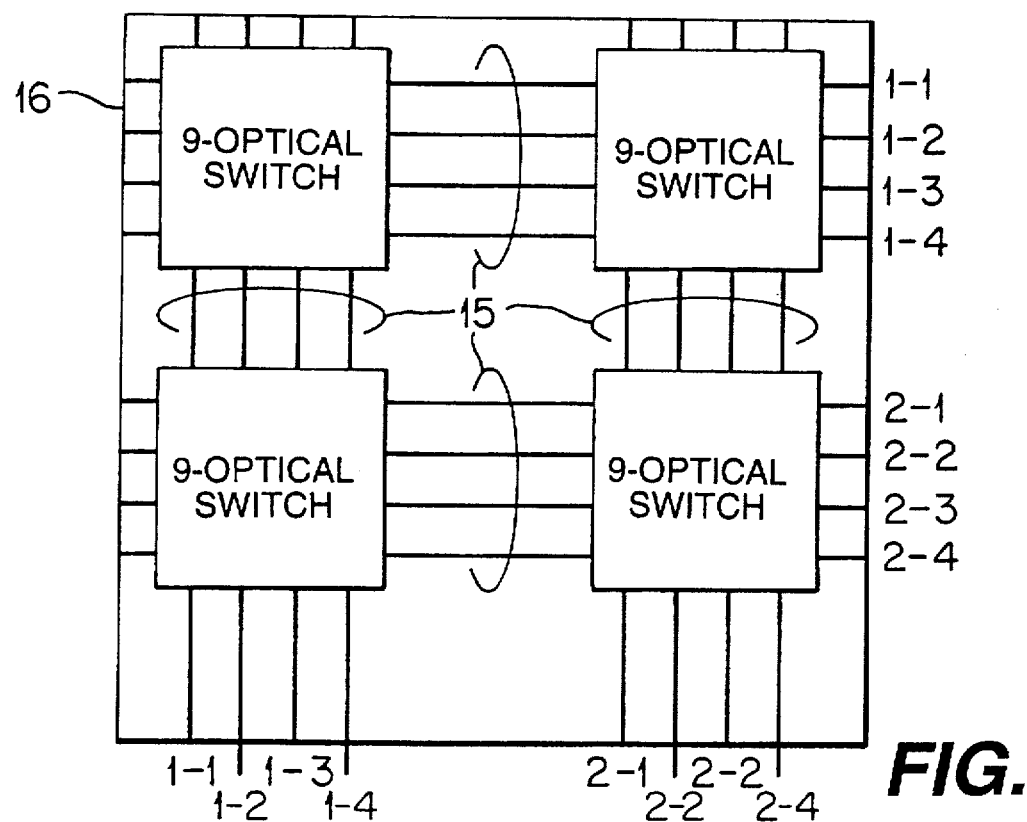
FIG. 12 is an optical switch connection diagram.

A plurality of optical switches 9 according to any of the embodiments of the present invention can be connected in matrix form to constitute a large-scale optical switch apparatus 16 (FIG. 12). The input optical waveguides 1 of each of the optical switches 9 are connected to those of the adjacent optical switch 9 such that the propagation directions are coincident with each other, by connecting optical fibers 15, and the output optical waveguides 2 of each of the optical switches 9 are connected to those of the adjacent optical switches such that the propagation directions are coincident, by the connecting optical fibers 15. In the present embodiment, four 4×4 optical switches 9 are illustrated to constitute the 8×8 matrix type of exemplary optical switch apparatus 16. Similarly, by changing the number of the optical switches 9, a larger-scale optical switch apparatus can be easily constituted. For example, a 1000×1000 crossbar optical switch apparatus has an insertion loss of not greater than 2 dB and a crosstalk of 30 dB, according to the invention.

Figure 13:
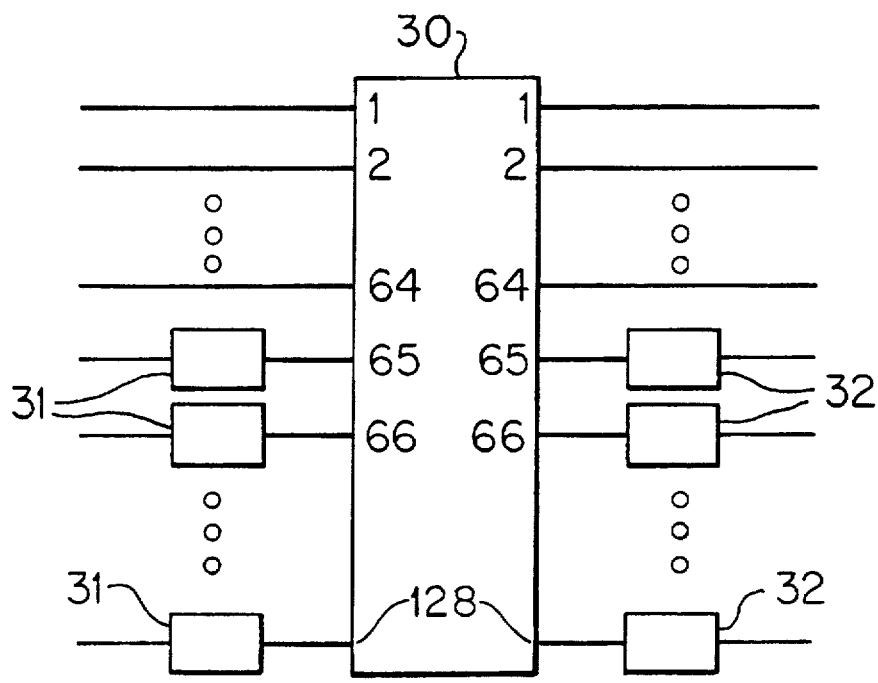
FIG. 13 illustrates the construction of an optical cross-connect.
Figure 14:
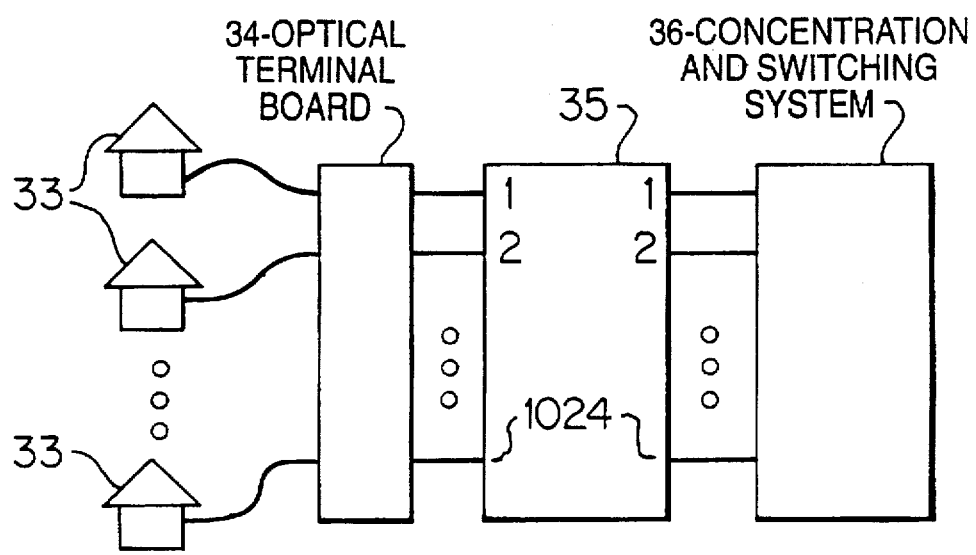
FIG. 14 schematically illustrates the construction of an optical main distribution frame.
Figure 15:
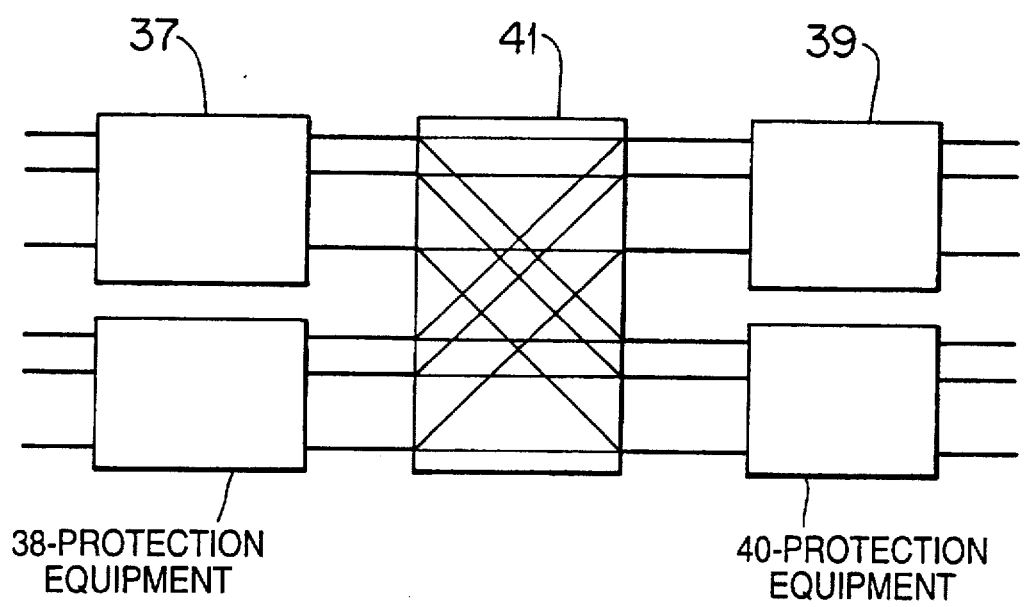
FIG. 15 illustrates an optical protection switch design.

By utilizing this connecting method, the present invention can be applied to a system which requires large-scale optical switch arrays. FIG. 13 shows an embodiment in which an optical switch constructed according to the present invention is applied to an optical cross-connect, including optical transmitters 31 that communicate with optical receivers 32 via optical switch apparatus 30. FIG. 14 shows an embodiment in which a 1024×1024 optical switch apparatus 35 according to the invention is employed in an optical MDF (Main Distribution Frame) connecting subscribers 33 to a concentration and switching system 36 via optical terminal board 34. FIG. 15 shows an embodiment which is used in an optical protection switch system, wherein optical switch apparatus 41 connects an optical function apparatus 37 to protection equipment 40, and an optical function apparatus 41 to protection equipment 39.

Figure 16:
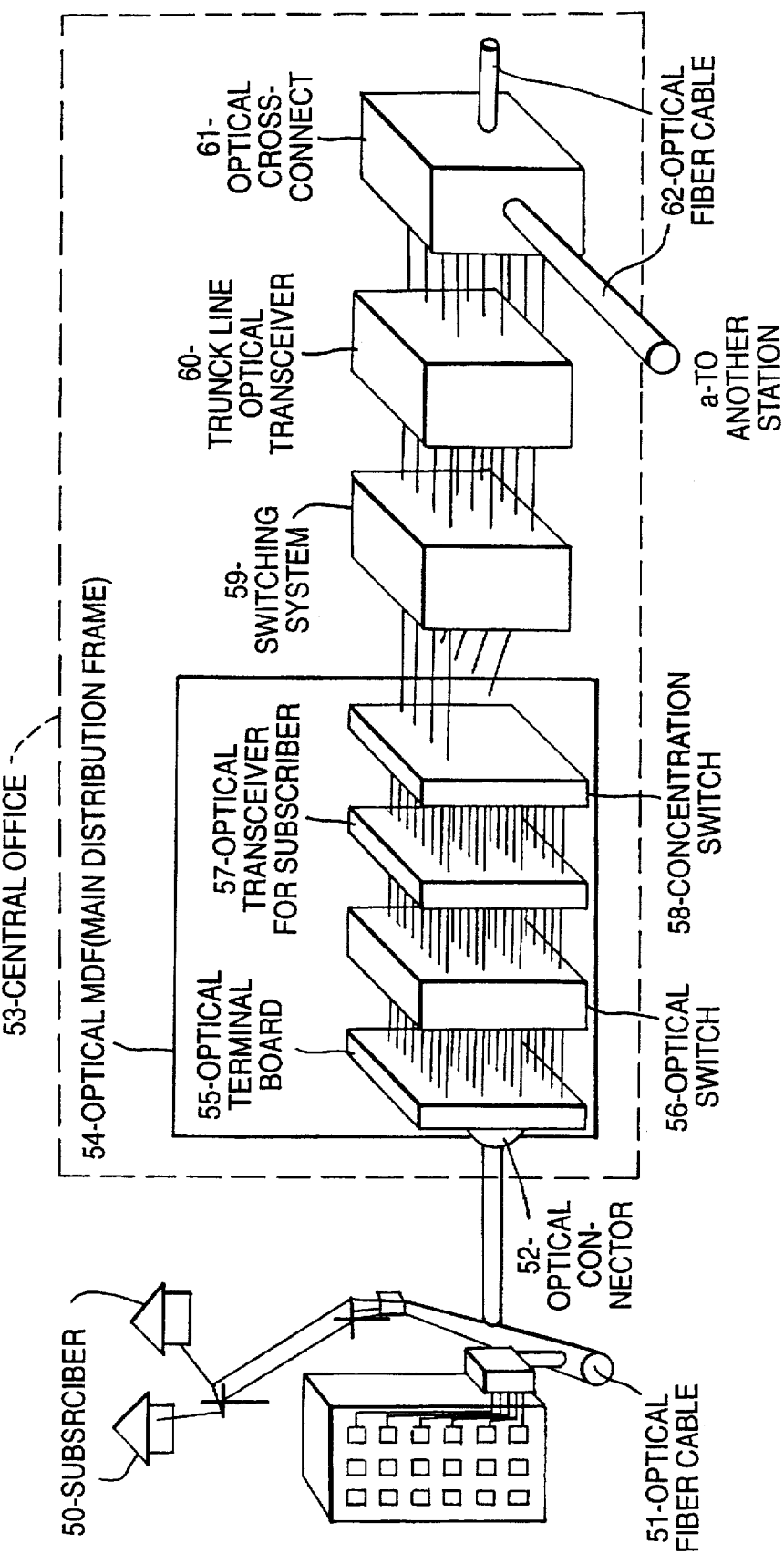
FIG. 16 illustrates an optical subscriber network system.

FIG. 16 shows a system in which the inventive apparatus is applied to an optical network which connects subscribers by means of optical fiber cables. The individual subscribers are connected to a central office 53 by optical fiber cables 51, and the central office 53 is further connected to other central offices by optical fiber cables 62, to form an optical network. The central office 53 includes an optical connector 52, an optical main distribution frame (optical MDF) 54, a switching system 59, a trunk line optical transceiver 60, and an optical cross-connect 61, for example. The optical MDF 54 may include an optical terminal board 55, an optical switch 56, an optical transceiver 57 for subscribers, and a concentrating switch 58.

Optical signals from subscribers 50 are input through the optical terminal board 55 connected to the optical connector 52. The connection between the subscribers 50 and the optical transceiver 57 for the subscribers 50 is established by the optical switch 56. In this case, to cope with the diversification of service requested by the subscribers 50 and frequent alterations of services, it is necessary to switch the connection between the subscribers 50 and the optical transceiver 57 for the subscribers 50.

Electrical signals from the optical transceiver 57 for the subscribers 50 are connected to the switching system 59 outside the optical MDF 54 through the concentrating switch 58. After being switched in a manner similar to telephony, the signals are sent to the trunk line optical transceiver 60 and outputted therefrom as optical signals. Connection to other central offices is set up by the optical cross-connect 61 and the optical fiber cable 62. The optical cross-connect 61 is an apparatus for receiving an optical signal from one central office and sending the optical signal to another central office as a light signal, or for inputting the optical signal into the trunk line optical transceiver 60. By using optical switches in the optical cross-connect 61, it is possible to process the optical signal as it is. Since high-speed lasers and photodiodes as well as electronic devices are not needed, the cost can be reduced. In addition, since the number of processing steps is decreased, the reliability can be improved.

By two-level crossing an input optical waveguide and an output optical waveguide, the input optical waveguide and the output optical waveguide are optically separated from each other, whereby it is possible to reduce optical leak which causes crosstalk. By forming each of the input optical waveguide and the output optical waveguide into a straight shape, it is possible to avoid the loss due to bending waveguides or to suppress an increase in the device size caused by increasing a radius of curvature. In addition, since the optical waveguide located at a lower stage has a tunnel structure, it is possible to avoid the loss due to reflection and diffraction, which occur if part of the optical waveguide is covered with a clad layer. In addition, since accurate positioning is achieved by a stopper, a high efficiency of optical coupling can be realized with high reproducibility.

By adopting the aforesaid tapered shape, it is possible to suppress the influence of mismatch of the effective refractive index, and it is also possible to suppress the influence of the loss due to reflection and refraction.

In the present invention, the use of the dielectric liquid for refractive index matching makes it possible to stabilize the efficiency of optical coupling of the waveguides. By designing the input optical waveguide and the output optical waveguide so that each of them exhibits a minimum propagation loss, it is possible to suppress the insertion loss even if the size of the switch is made large. By decreasing the effective refractive indexes of the waveguides in the order of the output optical waveguide, the connecting optical waveguide and the input optical waveguide, the efficiency of optical coupling is improved. By designing the core of the connecting optical waveguide having a large size, it is possible to increase the tolerance of the connecting optical waveguide.

We claim:

1. An optical switch, comprising:

an input optical waveguide; and an output optical waveguide that constitutes a two-level structure with said input optical waveguide, wherein said output optical waveguide is switchable between a state of mutual optical coupling and a state of mutual optical decoupling with said input optical waveguide, said first and second signal propagation paths being noncoplanar when said input and output optical waveguides are in said state of mutual optical coupling.

2. An optical switch comprising:

a straight input optical waveguide;

a straight output optical waveguide; and a connecting optical waveguide that is selectively switchable between a two-level, noncoplanar switched-on optical coupling position and a switched-off position, said switched-on optical coupling position being selected by interposing said connecting optical waveguide between said input and output optical waveguides to optically couple said input and output optical waveguides via said connecting optical waveguide;

wherein said input optical waveguide and said output optical waveguide are optically separated from each other when said connecting optical waveguide is in said switched-off position; and wherein said input optical waveguide and said output optical waveguide are enabled for optical communication with each other via a two-level crossing when said connecting optical waveguide is in said switched-on optical coupling position.

3. An optical switch as claimed in claim 2, wherein said connecting optical waveguide includes a first waveguide region for optically coupling to said input optical waveguide, a second waveguide region for optically coupling to said output optical waveguide, and a third waveguide region connecting said first and second waveguide regions; and wherein said optical switch further comprises means for mechanically switching said connecting optical waveguide into and out of first and second positions in which said input and output optical waveguides are optically connected and optically separated, respectively.

4. In an optical switch having an input optical waveguide and an output optical waveguide that is noncoplanar with said input optical waveguide and optically separated therefrom, the improvement comprising:

a connecting optical waveguide switchable to constitute a two-level crossing optically connecting said input optical waveguide to said output optical waveguide.

5. An optical switch as claimed in claim 4, wherein said connecting optical waveguide includes a first waveguide region for optically coupling to said input optical waveguide, a second waveguide region for optically coupling to said output optical waveguide, and a third waveguide region connecting said first and second waveguide regions; and wherein said optical switch further comprises means for mechanically switching said connecting optical waveguide into and out of first and second positions in which said input and output optical waveguides are optically connected and optically separated, respectively.

6. An optical switch according to claim 5, further comprising:

a substrate to which said input and output optical waveguides are fixed; and a movable block on which said connecting optical waveguide is disposed.

7. An optical switch according to claim 6, further comprising magnetic means for moving said movable block to switch said connecting optical waveguide into and out of said first and second positions.

8. An optical switch according to claim 7, wherein said magnetic means comprises a coil on said substrate, and a magnetic portion of said movable block by which the position of said movable block is controlled by a magnetic field generated by an electric current flowing in said coil.

9. An optical switch according to claim 7, wherein said magnetic means comprises a coil on said movable block, and a magnetic portion of said substrate by which the position of said movable block is controlled by a magnetic field generated by an electric current flowing in said coil.

10. An optical switch according to claim 6, further comprising:

an electrode for generating an electric field and a wiring for charging said movable block with electricity, said electrode and said wiring being provided on said substrate, by which the position of said movable block is controlled by said electric field generated by said electrode and by the charge of said movable block.

11. An optical switch according to claim 6, further comprising an ultrasonic linear motor means, including a vibration plate provided on said substrate, for controlling the position of said movable block.

12. An optical switch according to claim 5, further comprising a plurality of said input optical waveguides and output optical waveguides, and a respective plurality of connecting optical waveguides operably arranged in correspondence therewith.

13. An optical switch according to claim 5, wherein said connecting optical waveguide is fixed to a substrate and one of said input optical waveguide and said output optical waveguide is movable along a rail.

14. An optical switch according to claim 13, wherein one of said input optical waveguide and said output optical waveguide is movable to a plurality of different positions, and at the position to which said one of said input optical waveguide and said output optical waveguide moves, at least one connecting optical waveguide is optically coupled to said one of said input optical waveguide and said output optical waveguide so that the propagation direction of an optical signal is switched.

15. An optical switch according to claim 14, wherein said input optical waveguide and said output optical waveguide are straight and move in parallel.

16. An optical switch as claimed in claim 2, wherein said connecting optical waveguide includes a first waveguide region which extends approximately in parallel with said input optical waveguide with a first gap provided therebetween, a second waveguide region which extends approximately in parallel with said output optical waveguide with a second gap provided therebetween, and a third waveguide region which optically connects said first and second waveguide regions, and means for optically coupling said first waveguide region and said input optical waveguide to each other, and for optically coupling said second waveguide region and said output optical waveguide to each other, by injecting a dielectric liquid into said gap, wherein said first waveguide region and said input optical waveguide are optically separated from each other, and said second waveguide region and said output optical waveguide are optically separated from each other when the dielectric liquid is absent from said gap.

17. An optical switch as claimed in claim 2, wherein said connecting optical waveguide includes a first waveguide region for coupling with said input optical waveguide with a first gap provided therebetween, a second waveguide region for coupling with said output optical waveguide with a second gap provided therebetween, and a third waveguide region which optically connects said first and second waveguide regions, and means for optically coupling said first waveguide region and said input optical waveguide to each other, and for optically coupling said second waveguide region and said output optical waveguide to each other, by injecting a dielectric liquid into said gap, wherein said first waveguide region and said input optical waveguide are optically separated from each other, and said second waveguide region and said output optical waveguide are optically separated from each other when the dielectric liquid is absent from said gap.

18. An optical switch as claimed in claim 2, wherein said connecting optical waveguide includes a first waveguide region optically coupled to said input optical waveguide, a second waveguide region optically coupled to said output optical waveguide, and a third waveguide region which optically couples said first and second waveguide regions together, one of said first, second and third waveguide regions being a gap which is selectively filled with a dielectric liquid to optically couple said first waveguide region to said second waveguide region, whereby when a dielectric liquid is injected into the gap, the gap is a waveguide that couples an optical signal propagating along said input optical waveguide through said connecting optical waveguide to said output optical waveguide, and whereby, when no dielectric liquid is present in said gap, ceases serving as a waveguide, so that said input optical waveguide and said output optical waveguide are optically separated from each other.

19. An optical switch according to claim 18, further comprising means for injecting said dielectric liquid into said gap to establish optical coupling between said input optical waveguide and said first optical waveguide region, said injecting means including a closed fluid circuit having a gas-containing chamber and means for heating the gas in said gas-containing chamber to cause said dielectric liquid to enter said gap as a direct result of a rise in gas pressure in said gas-containing chamber due to the heating of the gas therein.

20. An optical switch according to claim 18, further comprising means for injecting said dielectric liquid into said gap under pressure of a compressed gas.

21. A matrix-type optical switch array comprising a plurality of optical switches each constructed as set forth in claim 4, wherein the signal/crosstalk ratio per unit switch is not less than 60 dB, the insertion loss per unit switch is not greater than 0.01 dB, and the optical power of accumulated spontaneous emission occurring in said optical switch array is not less than −40 dBm.

22. An optical switch according to claim 4, wherein the space between the separated input and output optical waveguides is not less than 3 μm and not greater than 100 μm.

23. An optical switch as claimed in claim 4, further comprising a clad layer on one of said input and output optical waveguides and facing the other of said input and output optical waveguides, wherein said clad layer is not less than 8 μm long and not greater than 100 μm long.

24. An optical switch as claimed in claim 4, wherein the separation distance between the separated input and output optical waveguides is greater than the width of each of said input and output optical waveguides and less than three times said width of each of said input and output optical waveguides.

25. An optical switch array comprising a plurality of optical switches each constructed as set forth in claim 4, wherein each of said optical switches has i input optical waveguides and j output optical waveguides, said optical switches are arranged in an m×n matrix (m and n being integers and not less than 1), said input optical waveguides are connected to each other in such a manner that their directions of optical propagation mutually coincide, and said output optical waveguides are connected to each other in such a manner that their directions of optical propagation coincide with each other, so as to constitute a matrix optical switch array of (i×m)×(j×n).

26. An optical cross-connection apparatus employing an optical switch according to claim 4.

27. An optical main distribution frame apparatus employing an optical switch according to claim 4.

28. An optical protection switch apparatus employing an optical switch according to claim 4.

29. An optical cross-connection apparatus using a matrix optical switch array constructed as set forth in claim 21.

30. An optical main distribution frame apparatus employing a matrix-type optical switch array constructed as set forth in claim 21.

31. An optical protection switch apparatus employing a matrix-type optical switch array constructed as set forth in claim 21.

32. An optical network employing an optical main distribution frame apparatus according to claim 27.

33. An optical network employing an optical protection switch apparatus according to claim 28.

* * * * *